April 19, 1966 R. A. M. TOESCA 3,247,393
INTEGRATED GAS TURBINE GENERATOR UNIT
Filed Aug. 9, 1962 3 Sheets-Sheet 1

INVENTOR.
René Antoine Michel Toesca
BY Alvin Browdy
Attorney.

April 19, 1966 R. A. M. TOESCA 3,247,393
INTEGRATED GAS TURBINE GENERATOR UNIT
Filed Aug. 9, 1962 3 Sheets-Sheet 3

INVENTOR.
René Antoine Michel Toesca
BY Alvin Browdy
Attorney

United States Patent Office 3,247,393
Patented Apr. 19, 1966

3,247,393
INTEGRATED GAS TURBINE GENERATOR UNIT
René Antoine Michel Toesca, Robin-Dell, R.D. 1,
Boyertown, Pa.
Filed Aug. 9, 1962, Ser. No. 215,993
Claims priority, application France, Aug. 16, 1961,
870,876, Patent 1,304,701
10 Claims. (Cl. 290—52)

As is well known, in most low-power gas turbine generators, more particularly in those in which the power does not exceed 50 kw., the gas turbine shaft is driven at very high speed, namely at some 35,000 to 80,000 r.p.m., while the generator rotor is driven at speeds usually lying between 3,000 and 12,000 r.p.m.

In such units, reduction gears have to be provided, which, in most cases, are heavier than the gas turbine itself.

It is the object of this invention to overcome this drawback by providing a new turbine-engine driven current-generating machine which is of simple construction notwithstanding its high efficiency, thereby making it possible to considerably reduce the cost of this type of machine.

A machine according to this invention comprises, within a casing rigid with the stator of a rotary generator, supporting bearings for a shaft connecting the rotor of said generator to a turbine engine which consists of a centrifugal compressor joined side by side to a driving turbine which is rigid with the free extremity of said shaft, said shaft-supporting casing being furthermore rigidly connected to a second casing which forms the turbine engine enclosure.

Further characteristics of the invention will become apparent from the following description given with reference to the accompanying drawings, which are given by way of example only and not of limitation and in which.

Figure 1:
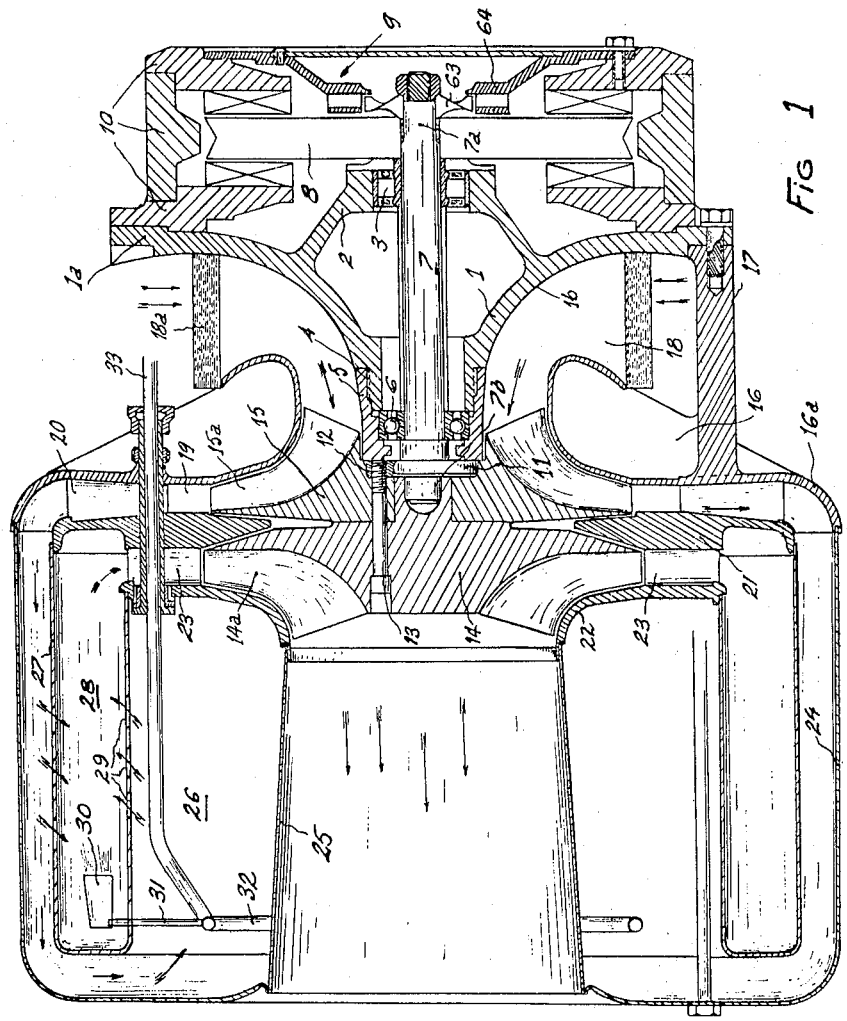
FIGURE 1 is a partly diagrammatic sectional side elevation view of a turbine engine generator set according to this invention.

Referring first to FIGURE 1, the turbine engine generator set shown thereon comprises a main casing 1 embodying, at one extremity, a supporting housing 2 for a bearing 3, said casing 1 being provided at its other extremity with a screw thread 4, onto which is screwed a housing 5 containing a second bearing 6. The two bearings 3 and 6 serve to support a shaft 7 the extremity 7a of which drives the rotor 8 of an electric generator which is generally designated by the reference numeral 9.

Said generator 9, which may be an A.C. generator, comprises a stator 10 the method of execution of which may vary widely; said stator is supported by a seat 1a embodied for the purpose in said main casing 1.

The other extremity 7b of shaft 7 forms a flange 11 provided with tapped holes 12 into which are screwed studs 13 which unite two wheels 14 and 15, which wheels are consequently also rigidly united with said flange 11 and hence with shaft 7.

Wheels 14 and 15 respectively constitute the rotor of a turbine and the rotor of a centrifugal compressor, which compressor is designed to co-operate with said turbine rotor, as will be described hereinafter.

The two wheels 14 and 15 are disposed within a secondary casing which is generally designated by reference numeral 16 and which is connected to main casing 1 by supporting spacers 17.

As may be clearly seen in FIGURE 1, casing 16 co-operates with the outer wall 1b of casing 1 to form an inlet duct 18 of progressively decreasing cross-section.

Casing 16 also forms, near the extremities of the blades 15a equipping the compressor 15, a duct 19 inside which are disposed a plurality of diffusers 20.

Furthermore, between the two wheels 15 and 14, casing 16 forms a separating partition 21, and, beyond said partition 21, a wall 22 which, in conjunction with partition 21, bounds ducts inside which are positioned nozzles 23 which are thus located opposite the leading edges of blades 14a of the turbine formed by wheel 14.

The outer peripheral edge 16a of casing 16 is utilized to support an enclosure 24 which may be fabricated, say, from stainless steel-plate or from any other convenient material. Said enclosure is annular shaped and is connected to a nozzle 25 which is likewise preferably fabricated from stainless sheet-metal and which is additionally secured to the wall 22 of casing 16 so as to act as a manifold for the gas exhausting from the turbine blades 14a.

As is clearly shown in the drawing, nozzle 25 and enclosure 24 bound an annular chamber 26 inside which is positioned a sleeve 27 which is preferably also fabricated from stainless sheet-metal and which is supported by the outer peripheral edge of wall 22 of casing 16 and by the outer peripheral edge of partition 21 (which is also bounded by said casing 16) in such manner that the interior of sleeve 27, which forms a chamber 28, communicate with the ducts containing the expansion nozzles 23 leading up to the turbine blades 14a.

The chamber 28 bounded by sleeve 27 constitutes a combustion chamber and communicates with the interior of chamber 26 through holes 29 the number and total cross-section of which are so chosen that the pressure drop in the air flowing from the point of exit from the blades of compressor 15 into the combustion chamber 28 be as small as possible, say about 0.05 kg./cm.².

Said combustion chamber 28 contains burners or injectors 30 to which the fuel is delivered through passageways 31 connected to a manifold 32 which is in turn supplied through a line 33.

As will be clear from the preceding description, turbine 14, compressor 15 and rotor 8 of generator 9 are rigid with shaft 7, which shaft is supported by the two bearings 3 and 6. It is consequently manifest that this assembly will form an extremely rigid hole which can be constructed in compact form.

Whereas, in the drawing, bearings 3 and 6 are respectively shown as being a roller-bearing and a ball-bearing, it will be clear to those skilled in the art that these bearing may be constituted in any other convenient manner; more particularly, they may be replaced by plain bearings or if necessary by so-called fluid bearings, namely by bearings operating hydraulically or pneumatically.

The manner of operation of the compound hereinbefore described is self-evident, for when the turbine is rotating it drives compressor 15 which in turn sucks air in through duct 18, the intake of which is preferably equipped with an air filter 18a.

The air which is drawn in by the compressor and then compressed is subsequently delivered through duct 19 and through diffusers 20, after which it enters chamber 26 and in so doing hugs the walls of the combustion chamber, bounded by sleeve 27, thereby ensuring cooling of said sleeve, in conjunction with heating of the inlet air penetrating into the combustion chamber through the holes 29.

Due to the fact that chamber 26 is bounded in part by the exhaust nozzle 25, a heat exchange process takes place between the exhaust gas and the air contained in chamber 26. This heat transfer can in fact be improved, if desired, by providing the nozzle 25 with ribs which project into chamber 26 and/or into the internal space bounded by said nozzle 25.

In the manner well known per se, the air admitted into combustion chamber 28 serves for the combustion of the fuel issuing from the burners or injectors 30, and the burnt gas resulting therefrom is constrained to pass through the expansion nozzle 23 leading up to the inlet of turbine rotor 14.

Since shaft 7 integrally transmits the motion imparted to it to the rotor 8 of generator 9, said generator 9 will be driven at the same speed as the turbine engine assembly hereinbefore described.

Figure 2:
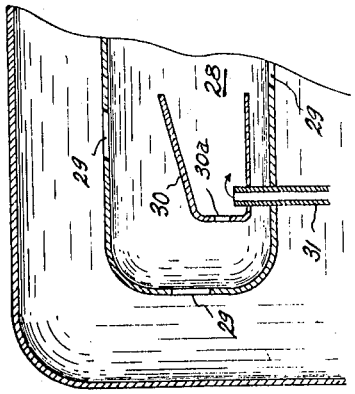
FIGURE 2 is a fragmentary sectional view on a larger scale, showing a detail of the method of construction.

In aiming at as simple a design as possible, it has been found advantageous to utilize burners 30 of the so-called vaporization type, consisting of wells into which the fuel is delivered drop by drop through the passageways 31, as is clearly shown in FIGURE 2. Since these wells are maintained at high temperature due to the combustion taking place in chamber 28, it follows that the fuel (kerosene, say) is immediately vaporized and ignited, a process which is facilitated by an air circulation provided within the wells themselves, the bottoms of which are preferably drilled with at least one hole 30a.

To regulate the operating speed of the machine, particularly when the combustion chamber is equipped with burners of the type briefly described hereinabove, it is preferable to adopt the layout shown in FIGURE 3. In this layout the passageway 33 leading up to the manifold 32 (see FIGURE 1) supplying the burners is connected to the delivery end of a fuel pump 34 which is connected through a line 35 to a tank 36. Pump 34 is preferably driven by an electric motor 37 which is itself energized by generator 9, and provision is made between passageway 33 and line 35 for a regulating device 38 adapted to meter the quantity of fuel delivered by pump 34 to the burners.

The drawing schematically illustrates how the regulator 38 may be designed. The body of the regulator embodies a cylinder 39, one extremity of which is connected to the passageway 33 through a tube 40 and the side wall of which is connected through a second tube 41 to the line 35.

The interior of cylinder 39 contains a piston 42 rigidly connected to a rod 43 over which is threaded a spring 44 which thrusts, on one hand, against said piston end, on the other, against an end-piece 45 which can be screwed, say, into and out of the cylinder by means of a knurled knob 46 or other suitable means.

Said piston 42 is normally positioned between the orifice of tube 40 and the orifice of tube 41. In this way the fuel delivered by pump 34 is normally led through passageway 33 to the burners, but when the pressure in said passageway 33 reaches a sufficient value, said pressure, which likewise prevails inside cylinder 39, thrusts away piston 42, thereby enabling part of the fuel delivered to be by-passed through tube 41 back to the suction end of pump 34.

By operating knurled knob 46 in the required direction, it is possible to alter the position of piston 42 and to consequently modify the pressure which the fuel must reach before it can thrust away said piston and this piston can, obviously, be moved into a position such that it uncovers the orifice of tube 41, thereby shutting off the supply to the burners 30.

In view of the fact that certain parts of the machine hereinbefore described must be lubricated, it will be of advantage to utilize the electric motor 37 which drives the fuel pump to drive at the same time a lubricating pump 47 which draws the lubricant from a tank 48 and delivers it through an oilway 49 to the various parts to be lubricated, and more specifically to the bearings 3 and 6, should this be necessary.

The method of feeding fuel to the machine as hereinbefore described makes it possible to use a very low pressure unit as the pump, for, since the burners described with reference to FIGURE 2 do not include an atomizing hole, it is possible to adjust the fuel pressure drop to a very low figure by an appropriate choice of the outlet section of the pasasgeways 31 delivering the fuel to the burners.

Figure 3:
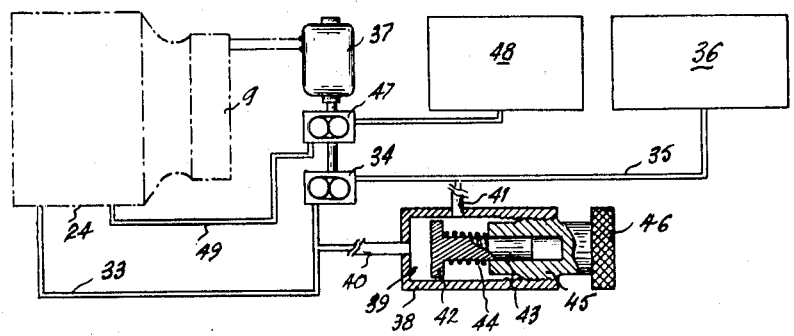
FIGURE 3 is a schematic diagram illustrating one possible embodiment of the mechanism utilized for supplying and controlling the unit shown in FIGURE 1.

It has been found that a pressure drop of about 0.04 kg./cm.$^2$ across the downstream end of the monitoring regulator of FIGURE 3 and the orifices of passageways 31 gives good results.

Since the electricity generating machine hereinbefore is not called upon to operate continuously but intermittently only, provision must be made for starting means, which means must evidently be adapted to the type of utilization for which the machine is destined.

Figure 4:
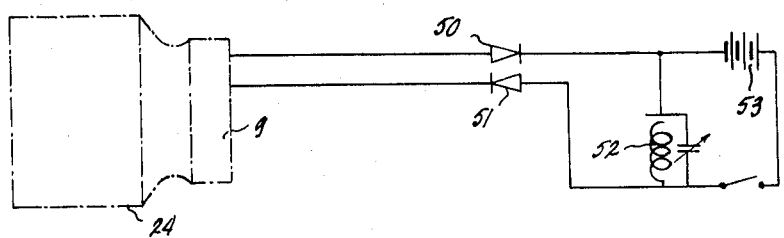
FIGURES 4 to 8 are schematic diagrams showing various possible embodiments of the mechanism for starting the turbine engine generator set according to FIGURE 1.

Reference is now had to FIGURE 4, wherefrom it may be seen that it is possible to resort to a particularly rational method of starting by using the generator 9 as a motor.

The terminals of said generator are accordingly connected through rectifier cells 50 and 51 to the terminals of an oscillator 52 which is energized by a battery 53. By using such a circuitry it is thus possible to use the generator as a motor for starting purposes.

Figure 5:
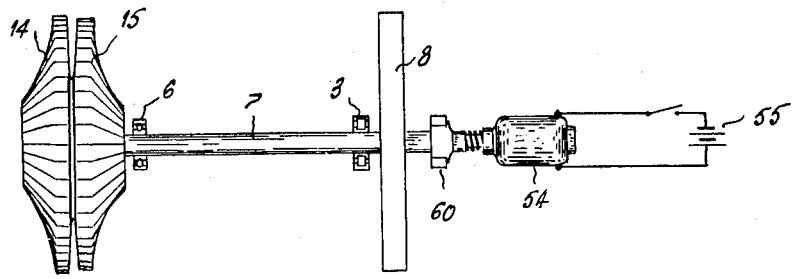

Provision may alternatively be made, as is clearly shown in FIGURE 5, for an independent electric motor 54 supplied directly by a battery 55, and this electric motor may be connected to shaft 7 through the medium of a convenient manually, electrically, hydraulically or otherwise controlled clutch 60.

Figure 6:
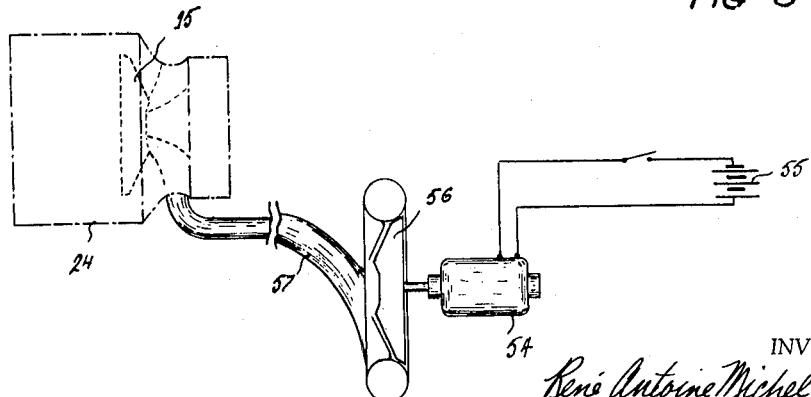

In the specific case where, for any reason, it is found inconvenient to mechanically connect shaft 7 to a clutch or like means, it is alternatively possible, as shown in FIGURE 6, to cause electric motor 54 to drive an independent air compressor 56 of the rotary type, say, the output end 57 of which is connected to the inlet of the air compressor 15 equipping the gas turbine generator set of the invention. Manifestly, with such an arrangement, the air issuing from independent compressor 56 will consequently drive compressor 15, thereby enabling the operating cycle to be initiated.

Figure 7:
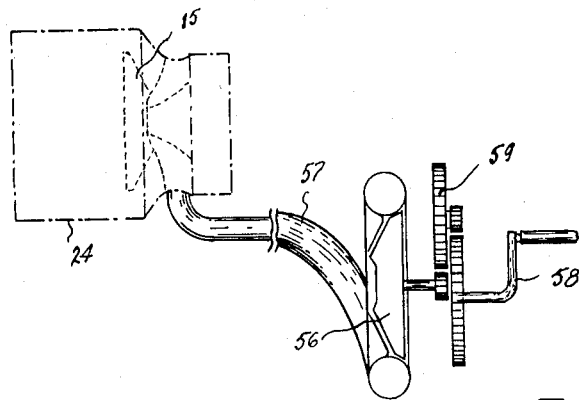

When, for any reason whatsoever, it is not possible to resort to a source of electric power such as the battery 55, the independent air compressor 56 can be driven manually by means of a handle 58 (FIGURE 7) coupled in driving relation to the rotor of said compressor 56 through a train of step-up gears 59.

Figure 8:
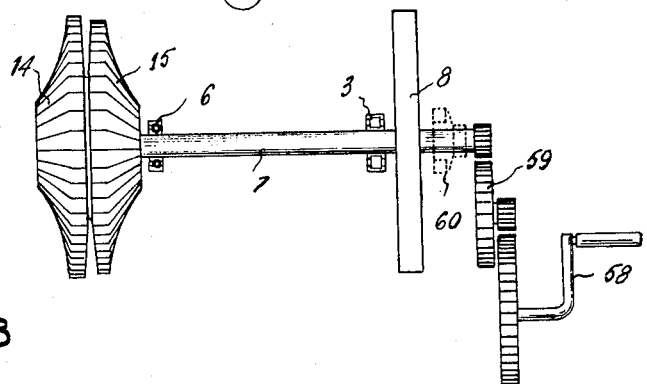

Referring now to FIGURE 8, it will be seen that it is likewise possible to start the turbogenerator set without the use of either an independent compressor or a source of electric power. Indeed, recourse may be had to the handle 58 and the train of step-up gears 59, in conjunction with the use of a clutch mechanism 60 or an ordinary escapement-type coupling enabling the gear train 59 to be coupled to the shaft 7 for starting purposes.

Figure 9:
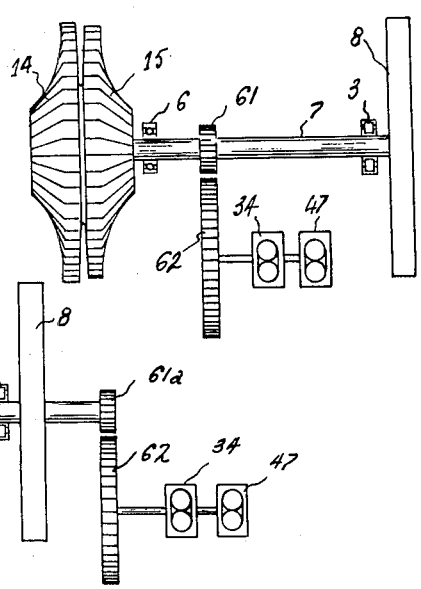
FIGURES 9 and 10 are highly diagrammatic illustrations of constructional modifications made to certain components of the set.
Figure 10:
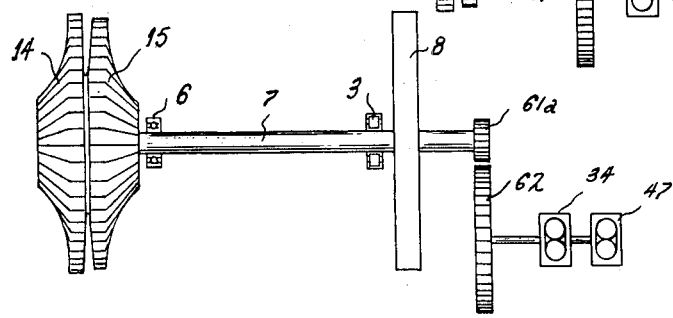

In most cases it will be of advantage for the accessories used with the machine to be independent of the latter. A case in point is illustrated in FIGURE 3 and has been described hereinabove with reference thereto. In this specific example, the fuel and oil pumps, which are driven by electric motor 37, can be placed anywhere, even remotely from the machine itself. If, for any reason, said accessories must be positioned close to the machine, it will evidently be possible to proceed in the same manner. Thus, as is more clearly shown in FIGURES 9 and 10, the accessories can be driven directly off the moving elements of the machine. To this end (see FIGURE 9), a pinion 61 is mounted on shaft 7 between bearings 3 and 6. This, obviously, calls for a modification to the shape of the casing but in no way alters the general structure of the machine. Through the medium either of a reduction pinion 62, a train of pinions, or like means, pinion 61 drives the various machine accessories and more particularly the fuel pump 34 and the oil pump 47. In cases where it is not considered desirable for pinion 61 to be positioned between the bearings, said pinion may be mounted on that extremity of shaft 7 which projects beyond the generator rotor 8, as is shown at 61a in FIGURE 10 wherein the pinions drive a common reduction gear 62 which operates for all the accessories, and for the pumps 34 and 47 in particular.

In addition to driving the various items of equipment referred to hereinbefore, and more particularly the fuel and oil pumps, shaft 7 can be used with advantage to drive other servo components. Indeed it will be of particular advantage, as shown in FIGURE 1, to provide the extremity 7a of shaft 7 with a small turbine 63 which co-operates with a diffuser 64 for cooling both the stator and the rotor of generator 9.

In certain cases, moreover, such cooling of the electrical components of the turbogenerator set can be achieved in other ways. In particular, it is possible to provide in the portion 1b of the casing 1 bounding the inlet duct, suitable ports which place the inlet duct 18 in communication with the chamber bounded by the stator 10 of generator 9. In this way, when the machine is operating, ambient air is drawn through the generator by compressor 15 thereby ensuring cooling of the latter.

While there have been shown and described, the presently preferred embodiments of the turbine engine generator set of this invention, it will be well understood by those skilled in the art that various changes and modifications may be made in these embodiments. More particularly, it is posible to rigidly connect the turbine 14 to one or more low pressure turbines, and more specifically to axial type turbines disposed within the exhaust nozzle 25, designed to recover part of the energy contained in the exhaust gas. Similarly, the machine can be started by compressed air contained in a tank supplied by a hand pump or by a circuit which places it in communication, during operation of the machine, with the delivery side of compressor 15, which compressor may incorporate a plurality of stages.

I claim:

1. A turbine engine generating machine comprising a casing, a stator of a rotary generator fixedly mounted to said casing, spaced bearings within said casing, a rotatable shaft supported by said bearings and extending therebeyond at both ends to provide first and second shaft extremities, the rotor of said generator being fixed to said shaft at said first extremity thereof, a turbine engine fixed to said shaft at said second extremity thereof, said turbine engine comprising a centrifugal compressor and a driving turbine joined side by side and to said shaft at said second extremity thereof, said casing extending to enclose said turbine engine and said shaft on the portion thereof extending between said bearings, said casing defining around said shaft an inlet air collector for said centrifugal compressor.

2. A machine as set forth in claim 1 wherein the internal diameter of said generator rotor and the external diameter of said first extremity of said shaft at their area of juncture is not greater than the internal diameter of said bearings; and wherein there are no more than two bearings supporting said shaft.

3. A machine as claimed in claim 1, further comprising a chamber into which air under pressure is delivered by said centrifugal compressor bounded on one side by said casing, an internal nozzle on the other side of said chamber through which circulates the exhaust gas issuing from said turbine, a sleeve within said chamber defining the combustion chamber of said engine turbine, and expansion nozzles between said combustion chamber and said driving turbine.

4. A machine as claimed in claim 3, wherein said sleeve bounding the combustion chamber is provided with holes therein the total area of which is such that the pressure drop across the chamber into which the air is delivered under pressure by the compressor and the combustion chamber is on the order of 0.05 kg./cm.$^2$.

5. A machine as claimed in cliam 3, further comprising vaporization type burners in said combustion chamber consisting of a plurality of wells and means for delivering the fuel drop by drop, into said wells and walls defining holes for passage of the fresh air delivered into said combustion chamber, whereby the flame jet issuing from said burners is directed toward said expansion nozzles leading into said driving turbine.

6. A machine as claimed in claim 5, comprising a fuel feed pump and an adjustable loaded valve wherein the quantity of fuel delivered to the burners is metered by said adjustable loaded valve controlling a by-pass passageway provided between the delivery and suction ends of said fuel feed pump.

7. A machine as claimed in claim 6, wherein said fuel feed pump is driven by an independent driving unit.

8. A machine as claimed in claim 6, wherein said fuel pump is driven by a power take-off component coupled to said shaft.

9. A machine as claimed in claim 8, comprising two sets of said bearings wherein said power take-off component consists of a pinion positioned between said two sets of bearings which suport said shaft.

10. A machine as claimed in claim 8, werein said power take-off component consists of a pinion mounted on said rotor-supporting shaft and positioned beyond said generator rotor.

References Cited by the Examiner
UNITED STATES PATENTS

| | | | |
|---|---|---|---|
| 2,358,301 | 9/1944 | Brauns | 290—2 |
| 2,372,835 | 4/1945 | Kuhn et al. | 290—36 |
| 2,399,046 | 4/1946 | Larrecq | 290—52 X |
| 2,508,397 | 5/1950 | Kane | 290—52 X |
| 2,585,576 | 2/1952 | Nicolin et al. | 290—52 X |
| 2,632,856 | 3/1953 | Dupy | 290—40 |
| 2,671,860 | 3/1954 | Bevins | 290—52 |
| 2,770,096 | 11/1956 | Fox | 60—39.65 X |
| 2,809,299 | 10/1957 | Hazen | 290—40 |
| 3,030,518 | 4/1962 | Jensen | 290—36 |
| 3,071,691 | 1/1963 | Haddad et al. | 290—52 |

ORIS L. RADER, *Primary Examiner.*